Oct. 21, 1952     E. LAUGAUDIN     2,614,833
OLEO PNEUMATIC SHOCK ABSORBER
Filed March 25, 1948     3 Sheets-Sheet 2

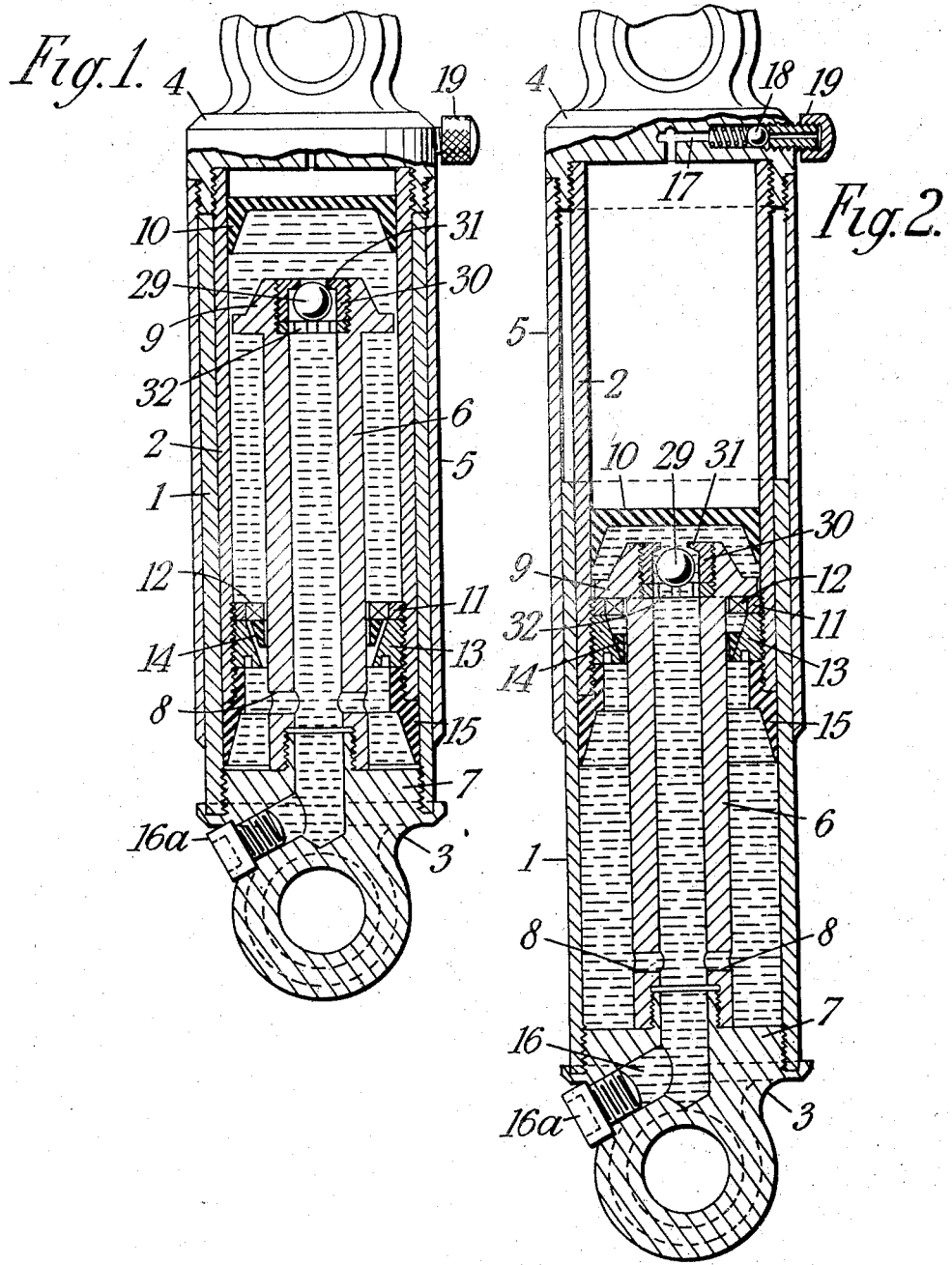

Inventor
E. Laugaudin

Oct. 21, 1952     E. LAUGAUDIN     2,614,833
OLEO PNEUMATIC SHOCK ABSORBER
Filed March 25, 1948     3 Sheets-Sheet 3

Inventor
E. Laugaudin

Patented Oct. 21, 1952

2,614,833

UNITED STATES PATENT OFFICE 2,614,833

OLEO PNEUMATIC SHOCK ABSORBER

Eugene Laugaudin, Toulouse, France

Application March 25, 1948, Serial No. 16,927
In France March 27, 1947

8 Claims. (Cl. 267—64)

1

The present invention relates to a shock absorber or damping device for terrestrial, aerial and marine installations, and armament installations and also for all industrial applications among others as a jack, comprising two cylinders sliding one within the other, closed at their opposite ends forming a chamber of variable volume; in this chamber a central hollow rod ending in the form of a piston of the same diameter as the inner cylinder and provided at the bottom with apertures and comprising a ball or valve which does not form a fluid-tight joint placed either at the inlet or at the outlet inside the hollow rod, a preferably conical ring sliding on the hollow rod and capable of moving in a preferably conical ring member but in opposite direction, attached to the inner cylinder at the end opposite to the bottom, a free piston or loose piston located between the bottom of the inner cylinder and the piston head of the hollow rod, the pressure of a compressed gaseous fluid, such as air, being exerted on one face of the loose piston and the pressure of a liquid fluid such as oil being exerted on the other face of the piston; under the action of shock (compression) the cylinders slide one within the other causing a reduction of volume of the chamber whereby on the one hand a compression of the gaseous fluid is caused which absorbs the kinetic energy of the shock and on the other hand a movement of the liquid fluid through the inner channel of the hollow rod this being braked by the ball or valve and thus causes the raising of the sliding ring which permits liquid fluid to enter the space between the piston head, the hollow rod and the inner wall of the inner cylinder; the return of the apparatus to its initial position (expansion) being braked by the action of the sliding ring which is applied on its ring member opposing more or less completely the flow of the part of the liquid fluid enclosed in the abovementioned space; the fluidtightness of the assembly being ensured by cups or rings having a tapered edge and constructed of any material, preferably of resilient metal, said cups or rings being applied under the action of the pressure existing in the apparatus on the inner or outer walls of the sliding cylinders; the loose piston ensuring the separation between the fluids being formed in the same manner for ensuring the fluidtightness between the two parts of the chamber of variable volume.

The accompanying drawing shows by way of example, a shock absorber according to the invention.

2

Figure 1 is a longitudinal section in which the two cylinders have moved one into the other under the action of a shock (compression) position.

Figure 2 is also a longitudinal section in which the shock absorber is returned to its starting position (expansion).

Figure 5:
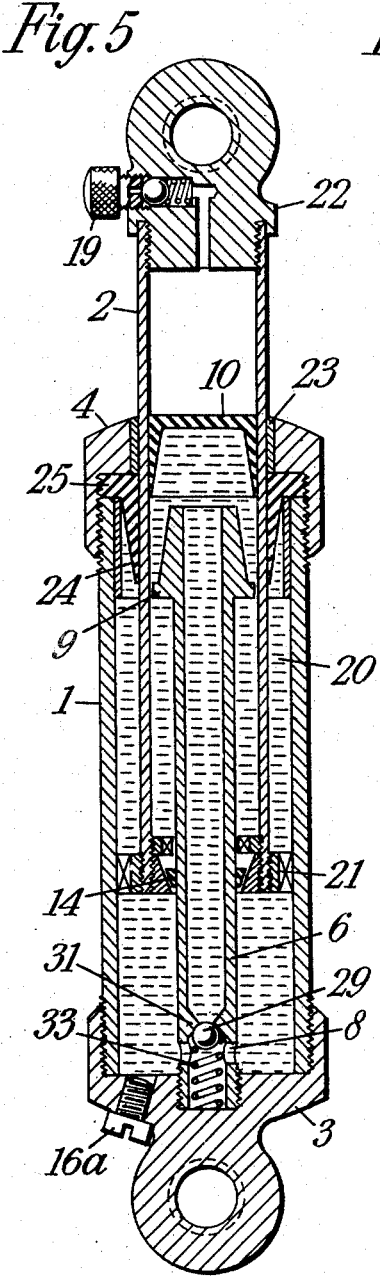
Figure 6:
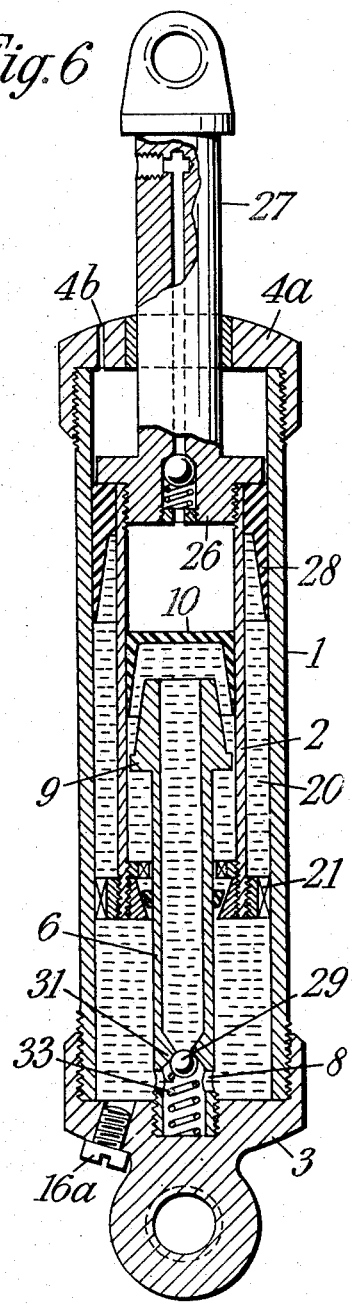

Figures 5 and 6 show in longitudinal section modifications of the shock absorber in which the two cylinders slide one within the other, but an annular chamber is left between them. In Figure 5 the fluidtightness of the assembly is ensured by a ring with tapered edges acting on the outer wall of the inner cylinder and in Figure 6 the fluidtightness is provided by a ring of the same type acting on the inner wall of the outer cylinder.

The shock absorber consists of two cylinders 1 and 2, the cylinder 2 sliding within the cylinder 1. Each of these tubes is provided at one end with a closing plug provided with means of attachment of any kind. The outer tube 1 is closed by the plug 3 and the inner tube 2 is closed by the plug 4.

A casing 5 partly surrounds the apparatus for protecting the surfaces of the tubes 1 and 2 which slide one upon the other against dust. The outer cylinder 1 carries a central rod 6 which is hollow and fixed to a base 7 which forms part of the plug 3. Inside the hollow rod there is a valve which is partially fluidtight with respect to inlet and outlet. In the embodiment shown in Figures 1 and 2, the partially fluidtight valve consists of a ball 29 arranged in a cage 30 located in the piston head 9. The upper part of this cage forms a seating 31 on which the ball can rest, but this seating is provided with grooves or notches which provide a limited passage for oil when the ball is applied against its seating (compression). In contradistinction, the lower part 32 of the cage is provided with larger apertures which in the expansion position afford a large passage for the oil.

This valve can be placed at the bottom of the hollow rod 6 above the apertures 8 and can be of the type shown and described for Figures 5 and 6.

At the lower part of the rod 6 apertures 8 are formed which place the interior of the rod 6 in communication with the interior of the cylinder 1.

The head of the rod 6 is provided with a piston head 9 of the internal diameter of the cylinder 2 and of such a shape that it avoids the deterioration of the cup 10 to which reference is made hereinafter.

This cut 10 consists of a loose piston arranged in the inner cylinder 2 between the piston head 9 of the rod 6 and the closing plug 4 of the inner cylinder 2. It is of the same diameter as the said inner tube 2. In the example shown this cup is provided with a tapered edge which, as will be seen below, is applied against the inner wall of the cylinder and forms a perfect joint.

During the operation which will be explained below, it may happen that the said cup becomes applied against the upper part of the hollow rod 6. The part projecting from the head 9 of the said rod prevents the risk of damage to its tapered edge.

This cup can be replaced by a simple disc of sufficient thickness forming a kind of loose piston. Whether a cup or a disc is used it can be constructed of any suitable material, or if necessary it can be omitted according to the intended applications.

One other device completes the apparatus. This device which consists of a group of parts is fixed to the other end of the inner cylinder 2 (the end opposite that which is closed by the plug 4).

This device comprises one part consisting of a head 11 screwed in the cylinder 2. It surrounds the rod 6 and is provided with holes or apertures 12 of any kind for the passage of the liquid fluid.

A ring 13 is also screwed in the tube 2 below the head 11 until it comes into contact with the latter and it is shaped so as to form around the rod 6 a conical chamber in which there is located and retained by it a sliding ring which is also conical but in the opposite direction surrounding the central rod 6. The dimensions of the ring are such that it can move along the rod 6 in the conical chamber for the purpose of the operation which will be indicated below.

Finally on the inner end of the tube 2, a packing ring 15 having a tapered edge is screwed, said ring being constructed of any suitable material. This ring is applied in the inner surface of the tube 1.

The assembly is completed by a fluid inlet conduit 16 in the base 7 closed by a plug 16a for introducing liquid fluid and the conduit 17 with retaining valve 18 and plug 19 for introducing compressed gaseous fluid.

The operation of the shock absorber is as follows: The shock absorber being in the position shown in Figure 2 a suitable quantity of liquid fluid such as oil is sent through conduit 16 into the apparatus where it runs into the hollow rod 6 and passes through the apertures 8 into the cylinder 1 and into the space between the piston head 9 of the rod 6 and the cup 10. On the other hand a certain quantity of compressed gaseous fluid, such as compressed air, is sent through the conduit 17 into the cylinder 2. The cup 10 ensures the separation between the two fluids. In the position of rest the various parts occupy the positions shown in Figure 2.

The shock absorber operates by axial pressure.

Under the action of a shock the two cylinders 1 and 2 of the shock absorber slide one inside the other (see Figure 1) but as oil is incompressible the air becomes compressed as the cylinders move. Part of the oil passes through the central part of the rod 6, this flow being limited by the ball 29 which as already stated only incompletely closes the seat 31 against which it is forced by the oil pressure. The flow of oil causes the cup 10 to rise slightly above the piston head 9 and its tapered edge under the action of the force occasioned by the shock transmitted to the liquid fluid becomes applied strongly against the inner wall of the cylinder 2, thus preventing the passage of the compressed air and thus avoiding any emulsification of the liquid fluid.

Another part of the oil raises the conical ring 14 and passes through the conical chamber of the ring 13 and the holes 12, thus facilitating the movement of the movable parts of the shock absorber. For the same reasons of those indicated for the cup 10, the tapered edge of the packing ring 15 is applied against the inner wall of the cylinder 1 and opposes any escape of liquid fluid.

The equilibrium set up by the shock is rapidly broken when the shock is removed. The air expands and forces back the cylinder 1 and the parts attached thereto and tends to bring the assembly back to its initial position but the return to its position is checked. In effect the greater part of the oil readily passes through the large openings of the base 32 of the cage 30 (the ball 29 leaves its seating 31 and rests on the base of the cage 30) and through the openings of the hollow rod 6 but the part of the oil between the annular chamber surrounding the rod 6 and limited by the head of the latter and the ring 13 and the sliding ring 14 can only flow more slowly since the conical ring 14, instead of being raised from its seating as before to allow the free passage of liquid fluid, is on the contrary applied on its seating, and as it is calculated with a degree of freedom proportional to the desired braking it only allows the reduced passage of liquid fluid which is necessary for obtaining the required braking.

It will be noted that the movement of the piston 10 relatively to the piston head of the rod 6 is determined by the difference of volume of the two cylinders.

Figure 3:
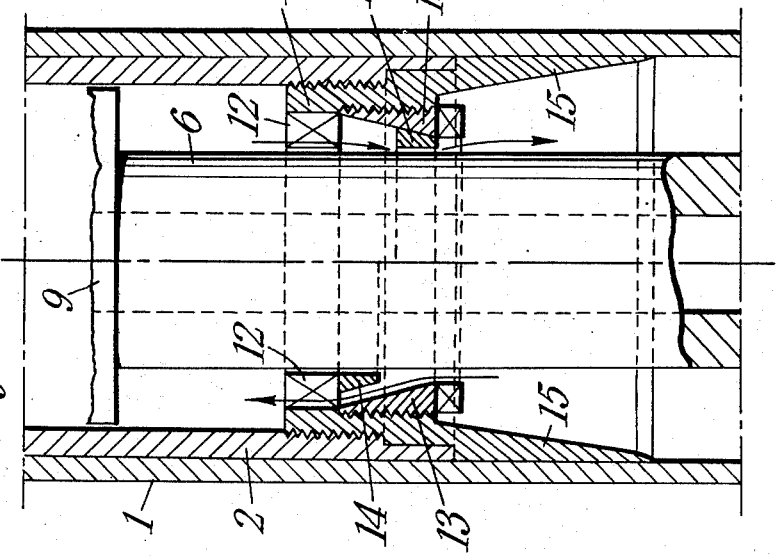
Figure 3 shows a modification on a larger scale the part of the shock absorber controlling the circulation of liquid fluid, the left-hand part corresponding to the compression position, the right-hand part corresponding to the expansion position.

Figure 3 shows on a larger scale a modification of the assembly of parts bearing the reference numerals 11 to 15 of the preceding figures.

The left-hand part corresponds to Figure 1 (compression) and the right-hand part corresponds to Figure 2 (expansion).

In this embodiment the parts 11 and 15 are machined from a single piece fixed to the end of the cylinder 2. The conical ring 13 is screwed in the latter, said ring and the sliding ring 14 being of the same type as before.

The arrow in the left-hand part (compression) indicates the passage of liquid fluid facilitated by the displacement movement of the ring 14 from its seating.

On the other hand in the right-hand part (expansion) the ring is applied against its seating and opposes the rapid flow of the liquid fluid thus providing a braking action.

Figure 4:
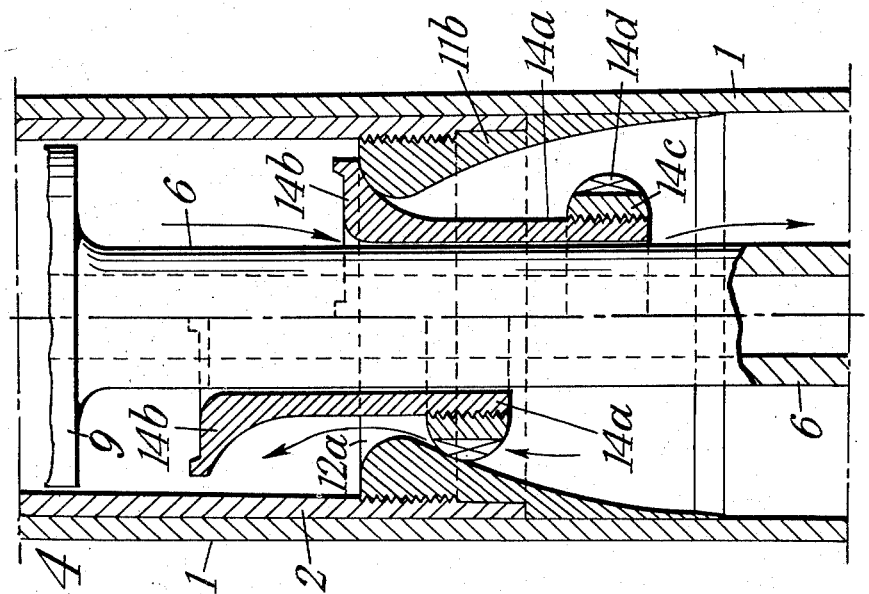
Figure 4 shows a modification on a larger scale of the parts shown in Figure 3, the left-hand part corresponding to the compression position, the right-hand part corresponding to the expansion position.

Figure 4 is a modification of the same group of parts and as in Figure 3 shows the compression stroke on the left-hand side and the expansion stroke on the right.

In this modification the group of parts 11, 15 of Figures 1 and 2 is slightly changed with respect to Figure 3. Instead of having openings 12 a certain annular space 12a is left by the part 11b round the rod 6. The conical ring 13 is omitted and the sliding ring 14 has the form shown at 14a. It is widened out at the top at 14b in order to rest on the upper part of 11b. A supplementary ring 14c provided with notches 14d is fixed at the lower part of the ring 14 and encloses it.

In the compression position (left-hand side of the figure) the ring 14a is raised and its head 14b disengages the annular opening 12a while the ring 14c coming into contact with the wall 11b limits the movement of the sliding ring 14a. Liquid fluid readily passes through notches 14d and through 12a as indicated by the arrow. On the contrary in the expansion position (right-hand side of the figure) the head 14b is applied on the upper part of 11b, the passage of oil being reduced (see its path according to the arrow) and the braking action on return is ensured.

The modification shown in Figure 5 (expansion position) is based on the same principles and the shock absorber operates in the same manner as before. In this modification the cylinder 1 is fixed and the plugs are fixed at its ends. The plug 3 is provided with an opening for introducing liquid fluid and the hollow rod 6 as before. In this modification the partially fluid-tight valve can be placed at the lower part of the hollow rod 6 above the apertures 8. It comprises as before a ball which rests on a seating provided with grooves or notches, a spring 33 tends to force it against this seating. The said valve could be replaced by that described and shown in Figures 1 and 2. As regards the plug 4 this is provided with an opening for the passage of the cylinder 2. The cylinder 2 instead of being in contact by means of its outer surface with the inner surface of the cylinder 1 as in Figures 1 and 2, is of a smaller diameter than the outer cylinder 1, an annular chamber 20 being left between the two cylinders. A ring 21 provided with holes for the passage of fluid into the chamber 20 is arranged at the bottom of the said cylinder 2 for guiding it during its movement. At the same end the assembly consisting of the conical ring and the sliding ring (11, 12, 13 and 14) is fixed as previously described.

At the other end of the cylinder 2 a plug 22 is fixed carrying a point of attachment and the valve assembly 19 for introducing gaseous fluid under pressure, the said gaseous fluid being contained in the upper part of the said cylinder 2 above the cup or loose piston 10.

The fluidtightness of the arrangement must be ensured so that liquid fluid cannot escape through the joint 23 which is inserted between the plug 4 and the cylinder 2.

For this purpose a ring having a tapered edge 24 and flange 25 is used, the flange being gripped between the plug 4 and the upper part, while the tapered edge of the ring is applied on the outer part of the cylinder 2 by means of the pressure exerted on it by the liquid fluid.

The operation of this modification of the shock absorber is the same as before. During the compression stage the cylinder 2 slides in the cylinder 1 and the liquid fluid passes through the central hollow rod 6 thus forcing back the ball 29 and through the apertures 12 in the ring 11, the sliding ring 14 being raised. For expansion the return of the liquid fluid is checked on account of the fact that the ball 29 is applied on its seating and the conical ring is also applied on its seating as explained above.

Instead of providing a joint by means of a ring with tapered edge acting on the outer wall of the cylinder 2, the modification shown in Figure 6 shows the construction adopted for providing the joint by means of a ring with tapered edge 28, but in this case the tapered edge is applied against the inner wall of the cylinder 1. This entails any slight modification of the upper part of the shock absorber as shown. The plug 6 closing the cylinder 2 is located in the cylinder 1 which is closed by the plug 4a. The matter allows the passage of the rod 27 carrying at its end the means of attachment and comprising a conduit with ball valve for introducing gaseous fluid under pressure. A conduit 4b permits the passage of atmospheric air during the movement of the plug 26.

The upper part of the ring 28 with tapered edge is applied against the plug 26 and under the action of the pressure exerted by the liquid fluid its tapered edge is applied against the inner wall of the cylinder 1 thus opposing the passage of said fluid.

Otherwise the shock absorber is the same as in the modification of Figure 5 and the operation is identical.

For certain applications, the incompletely fluid tight valve can be omitted. This is the case more particularly in apparatus where it is not necessary to absorb the kinetic energy of the shock.

It is to be understood that reservations which have been made during the description of the shock absorber shown in Figures 1 and 2 also apply to the modifications of Figures 5 and 6 and the modifications of the group of parts 11 to 14 shown in Figures 3 and 4 and of the incompletely fluidtight valves are applicable to various embodiments. The general form of the apparatus, the dimensions, materials used and details of construction are given only by way of example and can be modified without departing from the spirit and scope of the invention.

I claim:

1. A hydraulic-pneumatic shock absorber comprised by two cylinders mounted in telescopic sliding relationship forming a variable volume, plugs closing one end of each of said cylinders, a rod having a central bore mounted at one end on the plug closing the outer cylinder and at its other end a piston slidably mounted in the inner cylinder, said rod having adjacent the end mounted on the plug holes communicating the bore with the outer cylinder, a valve in the bore in said rod and restricting the flow of liquid therethrough during relative extension of said cylinders, a valve ring in the inner cylinder having a valve seat of varying diameter surrounding said rod, a valve member having a surface of complementary varying diameter intermediate the rod and the valve ring, said valve member cooperating with the valve ring to allow free flow of liquid into the inner cylinder during telescoping of said cylinders but blocking said flow during relative extension of said cylinders, and a free piston in the inner cylinder intermediate the closed end thereof and the piston on said rod and dividing said inner cylinder into air and liquid chambers.

2. A hydraulic-pneumatic shock absorber comprised by two cylinders mounted in telescopic sliding relationship forming a variable volume, plugs closing one end of each of said cylinders, a rod having a central bore mounted at one end on the plug closing the outer cylinder and at its other end a piston slidably mounted in the inner cylinder, said rod having adjacent the end mounted on the plug holes communicating the bore with the outer cylinder, a ball valve in the bore in said rod and restricting the flow of liquid therethrough during relative extension of said cylinders, a valve ring in the inner cylinder and having a tapered valve seat surrounding said rod, a valve member having a complementary tapered surface positioned intermediate the rod and the valve ring, said valve member cooperating with the valve ring to allow free flow of liquid into the inner cylinder during telescoping of said cylinders but blocking said flow during relative extension of said cylinders, and a free piston in the inner cylinder intermediate the closed end thereof and the piston on said rod and dividing said inner cylinder into air and liquid chambers.

3. A hydraulic-pneumatic shock absorber comprised by two cylinders mounted in telescopic sliding relationship forming a variable volume, plugs closing one end of each of said cylinders, a packing ring having a cylindrical top section mounted on one of said cylinders and a tapered skirt in sliding engagement with the other of said cylinders, a rod having a central bore mounted at one end on the plug closing the outer cylinder and at the other end a piston slidably mounted in the inner cylinder, said rod having adjacent the end mounted on the plug holes communicating the bore with the outer cylinder, a ball valve in the bore in said rod and retarding the flow of liquid therethrough during relative extension of said cylinders, a valve ring in the inner cylinder and having a tapered valve seat surrounding said rod, a valve member having a complementary tapered surface positioned intermediate the rod and the valve ring, said valve member cooperating with the valve ring to allow free flow of liquid into the inner cylinder during telescoping of said cylinders but blocking said flow during relative extension of said cylinders, and a free piston in the inner cylinder intermediate the closed end thereof and the piston on said rod and dividing said inner cylinder into air and liquid chambers.

4. A hydraulic-pneumatic shock absorber comprised by two cylinders mounted in telescopic sliding relationship forming a variable volume, plugs closing one end of each of said cylinders, a packing ring having a cylindrical top section mounted at one end of the inner cylinder and a tapered skirt in sliding engagement with the other of said cylinders, a rod having a central bore mounted at one end in the plug closing the outer cylinder and at the other end a piston slidably mounted in the inner cylinder, said rod having adjacent the end mounted on the plug holes communicating the bore with the outer cylinder, a ball valve in the bore in said rod and restricting the flow of liquid therethrough during relative extension of said cylinders, a valve ring mounted in the inner cylinder abutting the cylindrical section of the packing ring and having a tapered valve seat surrounding said rod, a valve member having a complementary tapered surface positioned intermediate the rod and the ring, said valve member cooperating with the valve ring to allow free flow of liquid into the inner cylinder during telescoping of said cylinders but blocking said flow during relative extension of said cylinders, a retaining ring positioned in the inner cylinder above the valve ring to limit travel of the valve member, and a free piston in the inner cylinder intermediate the closed end thereof and the piston on said rod and dividing said inner cylinder into air and liquid chambers.

5. In a hydraulic-pneumatic shock absorber comprised by two cylinders mounted in telescopic relationship forming a variable volume, plugs closing one end of each of said cylinders, a packing ring having a cylindrical top section mounted in the bottom of the inner cylinder and a tapered skirt in sliding engagement with the outer cylinder, a rod having a central bore mounted at one end on the plug closing the outer cylinder and at its other end a head including a piston slidably mounted in the inner cylinder, said rod having adjacent the end mounted on the plug holes communicating the bore with the outer cylinder, a ball valve in the bore in the head of the rod adjacent the end having the piston thereon and restricting the flow of liquid therethrough during relative extension of said cylinders, a valve ring mounted in the inner cylinder and having a tapered valve seat surrounding said rod, a valve member having a complementary tapered surface positioned intermediate the rod and the ring, said valve member cooperating with the valve ring to allow free flow of liquid into the inner cylinder during telescoping of said cylinders but blocking said flow during relative extension of said cylinders, and a free piston in the inner cylinder intermediate the closed end thereof and the piston on said rod and dividing said inner cylinder into air and liquid chambers.

6. In a hydraulic-pneumatic shock absorber comprised by an outer cylinder and an inner cylinder mounted for sliding movement thereon and forming an annular variable liquid chamber, end caps closing one end of each of said cylinders, a packing ring having a cylindrical top section mounted on one of said cylinders and a tapered skirt in sliding engagement with the other of said cylinders, a rod having a central bore mounted at one end on the end cap closing the outer cylinder and at its other end a piston slidably mounted in the inner cylinder, said rod having adjacent the end mounted on the end cap holes communicating the bore with the outer cylinder, a valve in the bore adjacent said holes and restricting the flow of liquid therethrough during relative extension of said cylinders, a valve ring mounted in the lower end of the inner cylinder and having a tapered valve seat surrounding said rod, a valve member having a complementary tapered surface positioned intermediate the rod and the ring, said valve member allowing free flow of liquid into the inner cylinder during telescoping of said cylinders but blocking such flow during relative extension of said cylinders, and a free piston in the inner cylinder intermediate the closed end thereof and the piston on said rod and dividing said inner cylinder into air and liquid chambers.

7. In a hydraulic-pneumatic shock absorber comprised by an outer cylinder, end caps closing said outer cylinder, an inner cylinder of lesser diameter than the outer cylinder slidably mounted in a suitable hole in one end cap of the latter and forming an annular liquid chamber of variable volume with the outer cylinder, a packing ring having a top flange gripped between the outer cylinder and its end cap and a tapered skirt in sliding engagement with the inner cylinder, a rod having a central bore mounted at one end on the other end cap of the outer cylinder and at its other end a piston slidably mounted in the inner cylinder, said rod having adjacent the end mounted on the end cap holes communicating the bore with the outer cylinder, a valve in the bore adjacent said holes and restricting the flow of liquid therethrough during relative extension of said cylinders, a valve ring mounted in the lower end of the inner cylinder and having a tapered valve seat surrounding said rod, a valve member having a complementary tapered surface positioned intermediate the rod and the ring, said valve member allowing free flow of liquid into the inner cylinder during telescoping of said cylinders but blocking said flow during relative extension of said cylinders, and a free piston in the inner cylinder intermediate the closed end thereof and the piston on said rod and dividing said inner cylinder into air and liquid chambers.

8. In a hydraulic-pneumatic shock absorber comprised by an outer cylinder, end caps closing said outer cylinder, a rod slidably mounted in a suitable hole in one end cap of the outer cylinder, an inner cylinder of lesser diameter than the outer cylinder and forming an annular liquid chamber of variable volume with the latter, a packing ring having a cylindrical top positioned at the juncture of said rod and the inner cylinder and a tapered skirt in sliding engagement with the inner cylinder, a second rod having a central bore mounted at one end on the other end cap of the outer cylinder and at the other end a piston slidably mounted in the inner cylinder, said rod having adjacent the end mounted on the end cap holes communicating the bore with the outer cylinder, a valve in the bore adjacent said holes and restricting the flow of liquid therethrough during relative extension of said cylinders, a valve ring mounted in the lower end of the inner cylinder and having a tapered valve seat surrounding said rod, a valve member having a complementary tapered surface positioned intermediate the second rod and the ring, said valve member allowing free flow of liquid into the inner cylinder during telescoping of said cylinders but blocking said flow during relative extension of said cylinders, and a free piston in the inner cylinder intermediate the closed end thereof and the inner cylinder and having a tapered valve seat surrounding said rod, a valve member having a complementary tapered surface positioned intermediate the rod and the ring, said valve member allowing free flow of liquid into the inner cylinder during telescoping of said cylinders but blocking said flow during extension of said cylinders, and a free piston in the inner cylinder intermediate the closed end thereof and the piston on said rod and dividing said inner cylinder into air and liquid chambers.

EUGENE LAUGAUDIN.

REFERENCES CITED

The following references are of record in the file of this patent:

UNITED STATES PATENTS

| Number | Name | Date |
|---|---|---|
| 2,155,605 | Levy | Apr. 25, 1939 |

FOREIGN PATENTS

| Number | Country | Date |
|---|---|---|
| 531,099 | Great Britain | Dec. 30, 1940 |